July 29, 1952  E. A. BODKIN  2,604,662
EXTRUSION OF INORGANIC OXIDE HYDROGELS
Filed Aug. 2, 1949
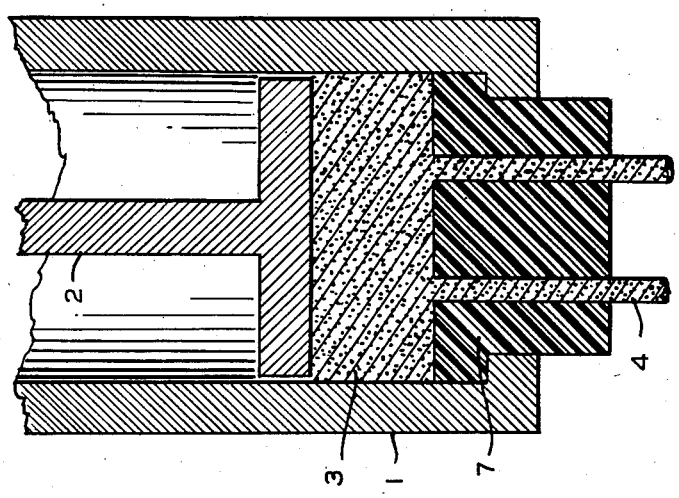
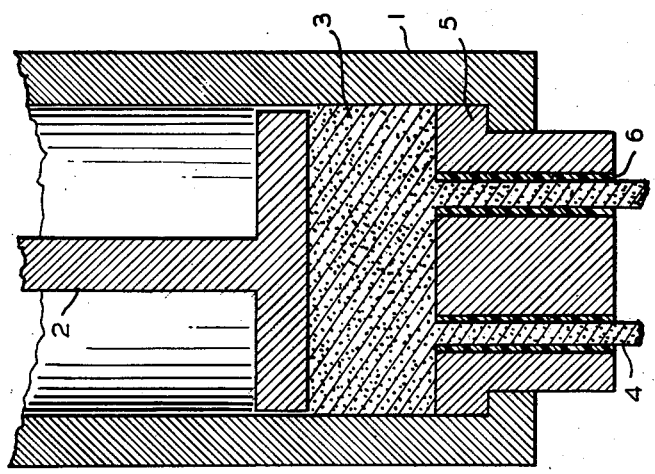
ERNEST A. BODKIN
*INVENTOR.*
BY Raymond W. Barclay
ATTORNEY OR AGENT Patented July 29, 1952

2,604,662

UNITED STATES PATENT OFFICE 2,604,662

EXTRUSION OF INORGANIC OXIDE HYDROGELS

Ernest A. Bodkin, Pitman, N. J., assignor to Socony-Vacuum Oil Company, Incorporated, a corporation of New York Application August 2, 1949, Serial No. 108,103

10 Claims. (Cl. 18—47.5)

1

This invention relates to a method for producing an extruded porous material of the nature of hydrogels and gelatinous precipitates and, more particularly, is directed to a process for improving the extrudability of mechanically shaped inorganic oxide hydrogels.

Such porous materials have, in the past, found wide application as adsorbents, desiccants, catalysts, and suitable surfaces for the deposition thereon of various materials, particularly those of a catalytic nature. Experience has shown that while such materials may be employed in fragmentary form, they are suitably prepared for use in the above and similar operations in the form of substantially identical, uniformly shaped particles. Various means have, accordingly, been adopted to render hydrogels and the like into a particle form of desired size and shape. Such means have included principally pelleting and extrusion.

The general procedure of forming porous materials into shapes by forcing a moist granular or powdered charge under pressure through an extrusion die is well known. The forms which the extruded material has assumed include rods, cylinders, tubes, etc., of various shapes, sizes, dimensions, and proportions. Extrusion has been accomplished with both hydraulic plunger type extruders and continuous auger type extruders. In both instances difficulty has heretofore been encountered in the extrusion of inorganic oxide hydrogels, due to adhesion of these materials to the walls of the metal die openings and occasionally due to die corrosion arising from acidic properties of the particular charge undergoing extrusion. These operational difficulties have resulted in irregular, physically weak products. Under such conditions, the particles produced by mechanically cutting the extruded spaghetti-like material have been non-uniform in length and have possessed inadequate physical strength and hardness sufficient to resist abrasion under all conditions of handling and treatment.

A reasonable uniformity in particle size and hardness is a prerequisite for a number of applications to which extruded hydrogel particles are subjected. Thus, it has heretofore been widely recognized that uniformly shaped catalyst particles are essential to trouble-free operation of units employed in the catalytic cracking of petroleum fractions. Likewise, in numerous other procedures, uniform packing of porous extruded particles is essential to the operational efficiency of the process using said particles.

2

Attempts to overcome the aforesaid difficulties and to provide uniformly extruded particles of requisite hardness have previously been directed to the provision of extrusion dies made of corrosion-resistant alloys. While such dies have considerably reduced corrosion problems, the sticking or adhesion of inorganic oxide hydrogel in the shaping section of the metal dies has not been alleviated despite the increased cost of material and fabrication. Further efforts to improve extrudability have involved the use of dies constructed from Monel metal and similar nickeliferous alloys which are capable of taking a high polish. Other suggestions have involved the use of glass, porcelain and similar materials of a ceramic nature. None of the aforementioned practices has been generally applicable in affording smooth, continuous extrusion of inorganic oxide hydrogels.

It is, accordingly, an object of the present invention to provide an efficient process for extruding inorganic oxide hydrogels in the form of uniformly shaped particles. A further object is to overcome the adhesion of hydrogel to the walls of the extrusion die during operation. A still further object is to provide an extrusion die resistant to the corrosive forces commonly encountered during extrusion of inorganic oxide hydrogels. A very important object is the provision of a process for extruding hydrogels which is capable of smooth, continuous operation, yielding a uniformly shaped product having a high degree of physical strength.

These and other objects which will be recognized by those skilled in the art are attained in accordance with the present invention, wherein extrusion of inorganic oxide hydrogels is efficiently accomplished by forcing the same through a die whose surface, in contact with the extrusion charge, is composed of a synthetic organic thermoplastic material having a hardness of between about 50 and about 130, as measured with a Standard Rockewll Hardness Tester, using a ½-inch steel ball and a force of 60 kilograms.

The present invention resides in the discovery that organic thermoplastic compounds having the above designated hardness characteristics are unexpectedlly adapted as the surface material of dies designed for mechanically shaping inorganic oxide hydrogels, since these materials do not adhere to the walls of extrusion dies composed of or coated with such materials. The extrusion dies may be made of metal or other material heretofore conventionally employed and contain a coating or liner of the above described thermoplastic, or the die may be made entirely of thermoplastic material. When a metal die contains a thermoplastic coating or liner, it is only necessary to cover those surfaces of the die which come in contact with the extrusion charge.

Without being limited by any theory, the fact that thermoplastic compounds having the above described hardness characteristics are peculiarly adapted as die surfaces in the extrusion of inorganic oxide hydrogels would appear to be due to a minute amount of wear of the thermoplastic surface as the extrusion charge is forced through the die opening. A small amount of wear or sloughing of the thermoplastic die surface has actually been observed with the use of such dies over extended periods of service.

With materials having a Rockwell hardness greater than about 130, substantially no wear of the die surface has been encountered and the extrusion charge, instead of moving readily through the die, as has been observed in the present process, tends to adhere to the walls of the die openings, partially plugging the same and giving rise to an uneven, erratic, and non-uniform flow of extruded product. Die surfaces composed of materials having a Rockwell hardness of less than about 50, on the other hand, lead to rapid wear of the die orifice and an enlargement of its diameter. This excessive wear not only contaminates the hydrogel undergoing extrusion but also necessitates frequent changes of the die plate in order to maintain the diameter of the extruded particles with relatively close tolerances. Moreover, under the usual operating conditions, the extruded product is cut by a knife edge into particles of desired length as it emerges from the die. The pressure of the knife against the extruded product creates a pressure of said product against one side of the die orifice, resulting in a greater wear on that side when the die surface is composed of a material of insufficient hardness characteristics. The result, in such instances, is that the die orifice does not wear uniformly, giving rise to an oval-shaped, enlarged die opening which, in turn, leads to the formation of a non-uniform extruded product.

By employing a thermoplastic die surface composed of a material having a Rockwell hardness of between about 50 and 130 (½-inch steel ball, 60 kg. force), it has been found, in accordance with this invention, that inorganic oxide hydrogels may be readily extruded without encountering the aforesaid difficulties. Representative thermoplastic materials possessing the desired degree of hardness for the above purpose include polystyrene, polyvinyl resins such as the polyvinyl chloride-acetate copolymer, polymethyl methacrylate commonly referred to in industry as Lucite, Plexiglas, Crystallite or Acylid, and various other synthetic organic thermoplastic materials, generally of a polymeric nature. Of these materials, particular preference is accorded to those having a Rockwell hardness on the above designated scale of between about 80 and about 130. Polystyrene and polymethyl methacrylate plastics, having a hardness within this range, have proved to be excellent materials in providing a die surface permitting the ready extrusion of inorganic oxide hydrogels.

Referring to the drawing, illustrating a simplified form of a hydraulic plunger type extruder having a die surface composed of a plastic material with the above described hardness characteristics:

Fig. 1 is a sectional view of an extruder in which the openings of the die plate are lined with the desired thermoplastic material.

Fig. 2 is a sectional view of an extruder in which the die plate is composed entirely of a thermoplastic material of the above described type.

In both figures, numeral 1 indicates an extrusion chamber provided with a ram 2. Upon the downward movement of the ram, the charge of hydrogel 3 is forced through the extrusion dies 4, having a surface composed of one of the aforementioned thermoplastic materials. In the embodiment shown in Fig. 1, the openings of a conventional metal die plate 5 contain thermoplastic liners 6. In Fig. 2, die plate 7 is composed wholly of the desired thermoplastic material. In both instances, the surface of the extrusion die exposed to contact with the charge of hydrogel is made up of a thermoplastic material having the requisite hardness, permitting uninterrupted extrusion of said charge and leading to a uniformly shaped product.

The thickness of the thermoplastic coating or liner covering the inner surface of the extrusion die is not critical, it being only necessary that direct contact is avoided between the extrusion charge and the metal making up the body of the die plate. Generally, however, due to the aforementioned slight wear of the plastic during extrusion, a liner of appreciable thickness is preferred, since it is more durable and frequent replacement of the plastic is thereby eliminated. Any feasible method for applying the thermoplastic coating or liner to the extrusion die may be employed. Thus, molten plastic may be painted or sprayed on the interior surfaces of the die openings; or a quantity of molten plastic may be permitted to flow through the die openings, leaving a film of plastic deposited on the interior surface thereof. This latter procedure may be repeated any desired number of times to build up a plastic coating of predetermined thickness. The metal die plate may also be dipped in a bath of molten plastic to provide the desired coating. Preshaped plastics in the form of tubes having a diameter only slightly less than the openings of the die plate may be forced through said openings to provide suitable liners therefor. In the case where the die plate is composed wholly of plastic, a solid block of the particular material employed is machined to the proper size and dimensions.

It is contemplated that the substance making up the extrusion charge is a solid, porous material, compound, or a mixture of porous materials having the consistency and extrusion characteristics of inorganic oxide hydrogels, gelatinuous precipitates, and similar moisture-containing porous materials or mixtures thereof. Thus, silica hydrogel may be admixed with various metal oxide hydrogels such as those of alumina, zirconia, titania, manganese oxide, thoria, and the like. These various hydrogels may be composited by any one of a number of methods. For example, silica and alumina hydrogels may be formed separately from solutions of suitable salts and then mixed mechanically or a hydrosol of silica and alumina may be prepared which sets to a silica-alumina hydrogel. Also, silica hydrogel may be immersed in solutions of metal salts and hydrous oxides deposited upon the silica hydrogel by means of hydrolytic adsorption. Solids which are not obtainable thoroughly admixed with other solids may be so mixed by mechanical means upon adding two or more materials to a ball mill, rod mill, or other pulverizing unit and agitating or grinding the material until the desired intimacy of mixing is attained. The process described herein is particularly adapted for the extrusion of inorganic oxide hydrogel composites having three or more components. Thus, the extrusion of silica-alumina-manganese oxide hydrogel and silica-alumina-chromic oxide hydrogel was particularly improved by the method of this invention.

The charge material should be characterized by a sufficient degree of plasticity and moisture so as to permit the ready extrusion thereof. In those instances where the charge is a dry, porous mass, water or other liquid is preferably admixed therewith and the resultant mixture kneaded or ball-milled to bring the charge in condition suitable for extrusion. In those instances where the charge is made up of freshly formed hydrogel, the amount of water in the charge may be decreased by admixing with a dry, powdered, porous material which may be either of the same or a different composition from that of the wet charge stock. Also, in the case of hydrogels, water contained therein may be released by freezing and thawing in accordance with the general procedure described in U. S. Patent No. 2,480,669. It is thus contemplated that any of the preliminary treatments for placing the inorganic oxide hydrogel charge material in extrudable form which have previously been used in the prior art may be employed in readying the charge material for use in the present extrusion procedure.

The water content of the porous mass undergoing extrusion is ordinarily such as to give a firm product while containing sufficient moisture to aid in lubricating the dies. The amount of water in the charge material depends in part on the particular composition and state of sub-division of the material. Generally, the water content of the charge will be between about 60 and about 85 per cent by weight of moisture. While water is preferred as the moistening or binding material for lending the desired degree of plasticity to the porous charge, other materials capable of aiding extrusion may be incorporated in the charge. Thus, the inorganic oxide hydrogel charge may have admixed therewith small amounts of mineral oil, castor oil, oleic acid, dextrin, locust bean gum, and other lubricants or improving agents for extrusion well known in the art.

The extruded material, upon emerging from the die, is ordinarily cut into short cylinders which are subsequently handled so as to maintain the identity of the individual particles. Thereafter, the particles are carefully dried and calcined at approximately 1000 to 1500° F. The average size of the extruded particles may vary greatly but ordinarily will be within the approximate range of 2 to 14 mesh. The size is not, however, necessarily restricted to short cylindrical shapes, since various other sizes or shapes may be formed during extrusion, depending largely upon the particular use to which the extrudate is to be subjected.

The following examples will serve to illustrate the method of this invention without limiting the same:

*Example I*

A silica-alumina-manganese oxide hydrogel was prepared by mixing 1.00 volume of a solution of sodium silicate containing 157.0 grams of $SiO_2$ per liter and 1.00 volume of a solution containing 39.79 grams of aluminum sulfate and 30.51 grams of sulfuric acid per liter. The resulting colloidal solution was ejected from a nozzle into a column of gas oil whose depth was about 8 feet. The globules of solution fell through the oil and gelled before passing into a layer of water located beneath the oil. The time of gelation for the concentrations and proportions of reactants given above was about 4 seconds. The spheroidal particles of silica-alumina hydrogel were conducted out of the bottom of the column into a stream of water and on removal from the water, base-exchanged with an aqueous solution containing two equivalent weights of manganese sulfate and one-half equivalent weight of ammonium sulfate, based on the zeolitic sodium content of the hydrogel (about 4 per cent $Na_2O$). The amount of MnO incorporated into the silica-alumina hydrogel by this means was about 4 per cent by weight, based on the finished dry product, the other components of silica and alumina being present in respective amounts of about 90 per cent and about 6 per cent by weight, based on the finished dry gel.

The resulting silica-alumina-manganese oxide hydrogel was then frozen by immersion in kerosene maintained at a temperature of 15° F. The frozen hydrogel was then drained free of kerosene and thawed by heating with live steam to a temperature above 32° F. Freezing and thawing caused the hydrogel particles to disintegrate into small granules and release about 63–67 per cent by weight of water originally present in the freshly formed hydrogel.

The water so released was decanted off and the residual hydrogel granules centrifuged in a basket-type centrifuge for 1½ minutes at about 3300 R. P. M. to give a hydrogel of 75–77 per cent by weight moisture content. The hydrogel granules were then placed in an extrusion chamber similar to that shown in Fig. 1 of the drawing. The hydrogel was then extruded at a pressure of 480 pounds per square inch through a 4-hole die, the interior of which was lined with polymethyl methacrylate (Lucite) having a Rockwell hardness number of 121 (using a ½-inch steel ball and a force of 60 kg.). The extrusion was smooth and the hydrogel flowed easily through all of the die openings to give a uniformly shaped product.

A second batch of silica-alumina-manganese oxide hydrogel was prepared and extruded in accordance with the above procedure, except that the plastic liners were replaced with brass liners. The extrusion in this case resulted in an erratic flow of hydrogel through the die openings. With an automatic cutter set to produce $\frac{3}{16}$ to ⅜ inch length extruded particles, less than 50 per cent of the particles falling within these length limits was produced when employing an all-metal die, whereas between 75 and 95 per cent of the particles extruded with the aid of plastic liners fall within the above defined length range.

*Example II*

A silica-alumina-manganese oxide hydrogel, prepared as described in the preceding example and containing 10 per cent by weight light oil was extruded through a 4-hole die, the surface of which was covered with a liner of polystyrene having a Rockwell hardness number of 124 (using a ½-inch steel ball and a force of 60 kg.). The extruded particles so produced were of uniform length. Substitution of brass liners for the polystyrene liners resulted in an erratic, uneven flow of hydrogel, giving rise to a non-uniform product. Examination of the die opening wall revealed considerable adhesion of the hydrogel charge to the surface of the brass liners. Substantially no adhesion of the hydrogel was observed when the plastic liners of polystyrene were used.

From the above examples, it will be seen that the extrudability of inorganic oxide hydrogels is greatly improved when the surface of the extrusion die is composed of a synthetic plastic such as polymethyl methacrylate or polystyrene. In addition to these materials, other synthetic thermoplastic substances may be employed having a hardness of between about 50 and about 130, as measured with a Standard Rockwell Hardness Tester using a ½-inch steel ball and a force of 60 kilograms. Materials having a hardness without the aforementioned range did not exhibit the non-adhesive property toward inorganic oxide hydrogels which has been observed when using the above described plastic materials. Thus, finely polished brass, chrome-nickel steel, hard glass, porcelain, and nickel-plated brass, all of which are harder than the aforementioned thermoplastic materials, were tested and were found to be inadequate in providing a smooth, continuous extrusion of inorganic oxide hydrogel. Materials characterized by a Rockwell hardness of less than about 50, on the other hand, did not have sufficient stability and durability for use as die liners in extruding inorganic oxide hydrogels. Thus, comparatively soft synthetic plastics, such as tetrafluoroethylene polymer (Teflon) and similar materials, are not suitable for use as die liners or surfaces in the procedure described herein.

Although pure thermoplastic materials having the above described hardness characteristics are preferred in the practice of this invention, these materials may be modified, providing the hardness characteristics of the plastics are maintained within the aforementioned range. Thus, the thermoplastic material may be mixed with other substances in varying amounts, including other synthetic organic plastic materials or various fillers such as silica, fluorspar, mica, fullers' earth, and the like. Those skilled in the art will, accordingly, recognize and understand the procedure described herein may be manifested in widely different embodiments and that the process of this invention is not to be limited except as hereinafter defined in the appended claims.

I claim:

1. A method for extruding inorganic oxide hydrogel, which comprises forcing the same through a die orifice whose surface, in contact with the hydrogel, is composed of a synthetic thermoplastic material unreactive with said hydrogel and having a Rockwell hardness number of between about 50 and about 130 (½-inch steel ball, 60 kg. force), whereby a smooth, uniform extrusion of said hydrogel is effected.

2. A method for extruding inorganic oxide hydrogel, which comprises forcing the same through a die orifice whose surface, in contact with the hydrogel, is composed of a synthetic thermoplastic material unreactive with said hydrogel and having a Rockwell hardness number of between about 80 and about 130 (½-inch steel ball, 60 kg. force), whereby a smooth, uniform extrusion of said hydrogel is effected.

3. A method for extruding an inorganic oxide hydrogel, which comprises forcing the same through a die orifice whose surface, in contact with the hydrogel, is composed of polystyrene, whereby a smooth, uniform extrusion of said hydrogel is effected.

4. A method for extruding an inorganic oxide hydrogel, which comprises forcing the same through a die orifice whose surface, in contact with the hydrogel, is composed of polymethyl methacrylate, whereby a smooth, uniform extrusion of said hydrogel is effected.

5. In the extrusion of an inorganic oxide hydrogel to a uniformly shaped product, the provision of a die having all surfaces to be contacted by the hydrogel extrusion charge composed of a synthetic thermoplastic material unreactive with inorganic oxide hydrogel and having a hardness of between about 50 and about 130 as measured with a Standard Rockwell Hardness Tester using a ½-inch steel ball and a force of 60 kilograms.

6. In the extrusion of an inorganic oxide hydrogel to a uniformly shaped product, the provision of a die having all surfaces to be contacted by the hydrogel extrusion charge composed of polystyrene.

7. In the extrusion of an inorganic oxide hydrogel to a uniformly shaped product, the provision of a die having all surfaces to be contacted by the hydrogel extrusion charge composed of polymethyl methacrylate.

8. A method for improving the uniformity of extruded particles, which comprises forcing a moist charge of an inorganic oxide hydrogel through a die orifice whose surface, in contact with said charge, is composed of a synthetic thermoplastic material unreactive with said hydrogel and having a Rockwell hardness number of between about 50 and about 130 (½-inch steel ball, 60 kg. force), whereby a uniformly extruded hydrogel is obtained, cutting the extruded material into particles of pre-determined length and drying said particles to yield a hard, uniformly shaped product.

9. A method for improving the uniformity of extruded particles, which comprises forcing a moist charge of an inorganic oxide hydrogel through a die orifice whose surface, in contact with said charge, is composed of polystyrene, whereby a uniformly extruded hydrogel is obtained, cutting the extruded material into particles of predetermined length and drying said particles to yield a hard, uniformly shaped product.

10. A method for improving the uniformity of extruded particles, which comprises forcing a moist charge of an inorganic oxide hydrogel through a die orifice whose surface, in contact with said charge, is composed of polymethyl methacrylate, whereby a uniformly extruded hydrogel is obtained, cutting the extruded material into particles of pre-determined length and drying said particles to yield a hard, uniformly shaped product.

ERNEST A. BODKIN.

REFERENCES CITED

The following references are of record in the file of this patent:

UNITED STATES PATENTS

| Number | Name | Date |
|---|---|---|
| 2,273,638 | Graves et al. | Feb. 17, 1942 |
| 2,403,476 | Berry et al. | July 9, 1946 |
| 2,408,215 | Keating | Sept. 24, 1946 |
| 2,422,325 | Wheelon | June 17, 1947 |